(12) United States Patent
Richardson et al.

(10) Patent No.: US 9,574,668 B2
(45) Date of Patent: Feb. 21, 2017

(54) ADJUSTABLE VALVE SLEEVE

(71) Applicant: PRATT & WHITNEY ROCKETDYNE, INC., Canoga Park, CA (US)

(72) Inventors: Roger Richardson, Simi Valley, CA (US); Raymond Wang, Simi Valley, CA (US)

(73) Assignee: AEROJET ROCKETDYNE OF DE, Inc., Canoga Park, CA (US)

( * ) Notice: Subject to any disclaimer, the term of this patent is extended or adjusted under 35 U.S.C. 154(b) by 35 days.

(21) Appl. No.: 14/646,777

(22) PCT Filed: Mar. 14, 2013

(86) PCT No.: PCT/US2013/031603
§ 371 (c)(1),
(2) Date: May 22, 2015

(87) PCT Pub. No.: WO2014/084890
PCT Pub. Date: Jun. 5, 2014

(65) Prior Publication Data
US 2015/0300503 A1    Oct. 22, 2015

Related U.S. Application Data

(60) Provisional application No. 61/730,468, filed on Nov. 27, 2012.

(51) Int. Cl.
*F16K 1/12* (2006.01)
*F16K 1/52* (2006.01)

(52) U.S. Cl.
CPC ............... *F16K 1/123* (2013.01); *F16K 1/126* (2013.01); *F16K 1/523* (2013.01)

(58) Field of Classification Search
CPC ........... F16K 1/123; F16K 1/523; F16K 1/126
USPC ......................................................... 251/285
See application file for complete search history.

(56) References Cited

U.S. PATENT DOCUMENTS

| 1,936,301 | A | * | 11/1933 | Hansen | ................... F16K 1/523 137/553 |
|---|---|---|---|---|---|
| 6,328,277 | B1 | | 12/2001 | Hanada | |
| 7,178,785 | B2 | | 2/2007 | McCarty | |
| 7,921,867 | B2 | | 4/2011 | Groves | |
| 2007/0284002 | A1 | | 12/2007 | Hartman | |

FOREIGN PATENT DOCUMENTS

JP         2004-232833         8/2004

OTHER PUBLICATIONS

International Search Report for PCT Application No. PCT/US2013/031603 mailed Aug. 9, 2013.

* cited by examiner

*Primary Examiner* — Marina Tietjen
(74) *Attorney, Agent, or Firm* — Joel G. Landau

(57) ABSTRACT

A valve includes a housing. A sleeve at least partially surrounded by the housing. The sleeve slidable relative to the housing and a travel stop that is engageable with the sleeve to limit travel of the sleeve.

10 Claims, 2 Drawing Sheets

ADJUSTABLE VALVE SLEEVE

The present disclosure claims priority to U.S. Provisional Patent Disclosure Ser. No. 61/730,468 filed Nov. 27, 2012.

BACKGROUND

The present disclosure relates generally to a valve, and, more particularly, to embodiments of adjustable sleeve valves for use in aerospace applications.

Valves for aerospace vehicles are commonly deployed to regulate fluid flow. Traditionally, fluid mixture ratio adjustments have been effected through the change-out of trim orifice plates adjacent to a main propellant valve in various open loop controlled systems, e.g., mixture ratio optimization of propellants in liquid propulsion rocket engines. This process is iterative, relatively time consuming and may require subsequent purge and leakage verification when associated with propellant feed lines.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
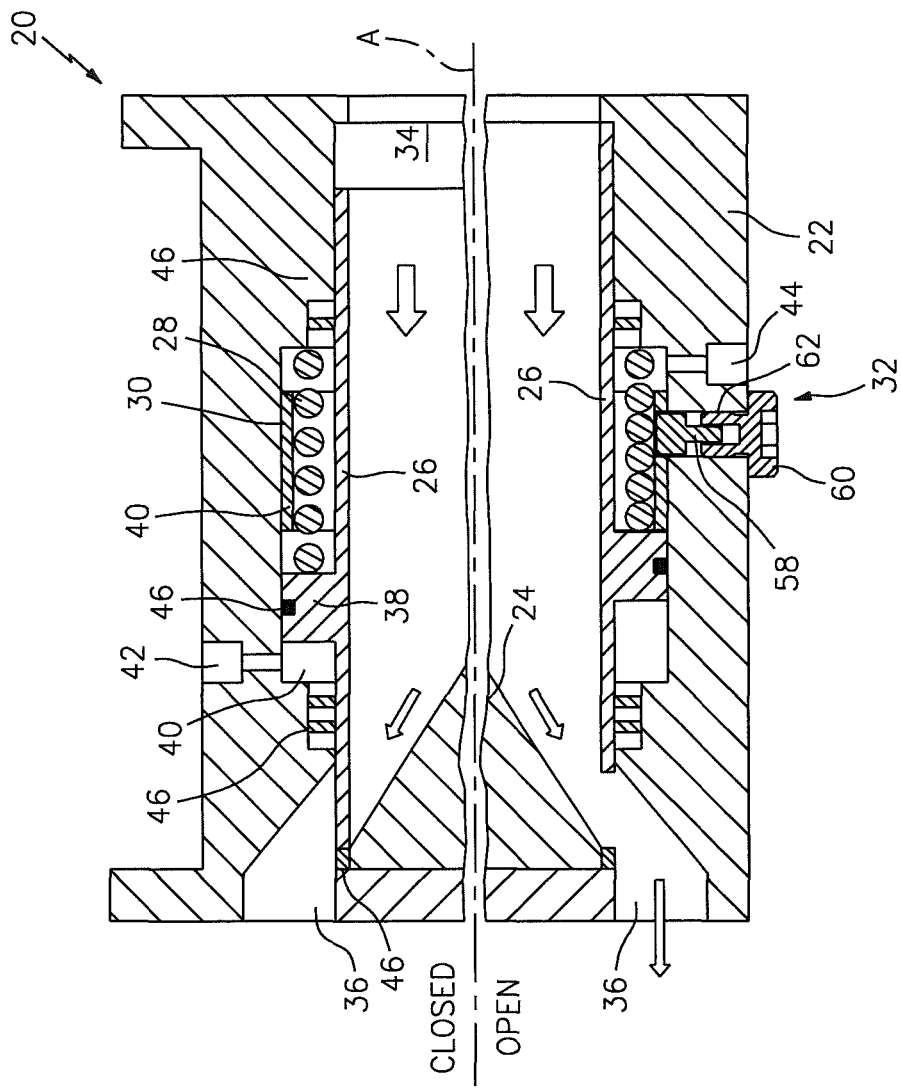
FIG. 1 is a general schematic sectional view of a sleeve valve according to one disclosed non-limiting embodiment.

FIG. 1 schematically illustrates a valve 20 that is essentially tubular in construction, although other shapes, such as rectilinear, will also benefit herefrom. Sleeve valves may be employed to control the flow rate and head pressure of fluids in propellant flow control valves for monopropellant and bipropellant thrusters to provide reliability and performance in, for example, shut-off valves for LOX and LH2 propellants in spacecraft propulsion systems. It should be appreciated that sleeve valves are readily applicable to industrial piping systems, hydro-power facilities, agricultural facilities, water distribution systems, medical, and other such systems as sleeve valves are often utilized for their ability to operate with actuation forces virtually independent of line pressure.

The valve 20 generally includes a housing 22, a flow diverter 24, a sleeve 26, a spring 28, a travel stop 30 and a travel stop lock 32 according to one disclosed non-limiting embodiment. The housing 22 defines a bore 34 along an axis A directed to the downstream located flow diverter 24. The flow diverter 24 may be at least partially conical to direct a flow from the inlet 34 radially outwardly through a multiple of outlet passages 36 arranged parallel to and around axis A.

The sleeve 26 is located within the bore 34 and includes a radial outward directed flange 38. The flange 38 separates an annular actuation inlet 40 which selectively receives fluid pressure through a first port 42 and/or a second port 44 located in communication with the annular actuation inlet 40 on either side of the flange 38. It should be appreciated that interfaces 46 between the housing 22, the flow diverter 24, the sleeve 26, the flange 38, the bore 34 and the annular actuation inlet 40 may be sealed against flow of gas or outside fluid by seals such as O-rings, seal rings, channel seals, etc.

The spring 28 may be located within the annular actuation inlet 40 such that, for example, fluid pressure applied into the first port 42 overcomes the spring bias to drives the sleeve 26 away form the flow diverter 24 to open the valve 20. In this example, the second port 44 may operate as a vent. Alternatively, the second port 44 may be in communication with a fluid pressure source to provide two-way active actuation either in addition to the spring 28 or in the alternative thereto.

Figure 2:
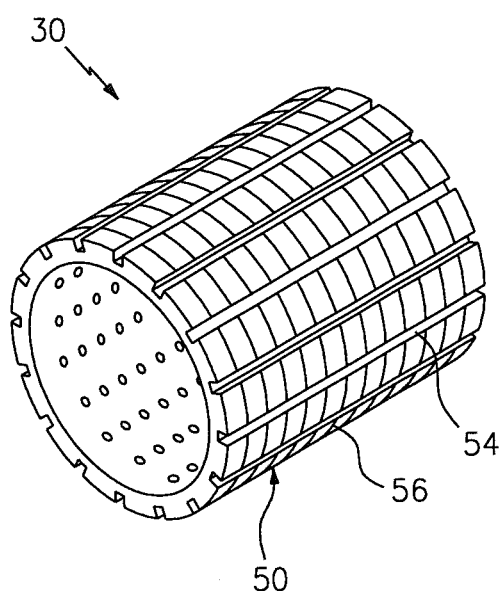
FIG. 2 is a perspective view of a travel stop according to one disclosed non-limiting embodiment for use with the valve of FIG. 1.

The travel stop 30 may include an interrupted thread 50 that is threaded into an internal thread 52 of the annular actuation inlet 40 to provide an adjustable mechanical stop to set the stroke travel limit of the sleeve 26. The interrupted thread 50 includes a multiple of linear slots 54 transverse to the threads 56 (FIG. 2) within which the travel stop lock 32 is received to rotationally—and thereby axially—lock the travel stop 30. Axial adjustment of the travel stop 30 facilitates precise flow resistance adjustment within a single valve. It should be appreciated that predetermined circumferential distances between the liner slots 54 provide predetermined adjustment capability and reduced variation in cycle to cycle flow resistance.

The travel stop lock 32 generally includes a threaded mount 60 that is threaded into a threaded opening 62 in the housing 22 to support and retain a key 58 that engages one of the multiple of linear slots 54. The key 58 is axially restrained by the threaded mount 60 in response to the threaded mount 60 being threaded into the housing 22. That is, the threaded mount 60 rotates while the key 58, supported in one of the multiple of linear slots 54, does not rotate.

Furthermore, through removal of the threaded mount 60 from the opening 62, the travel stop 30 may be externally adjusted through engagement with the linear slots 52. That is, the threaded mount 60 and the threaded opening 62 may be relatively large and transverse to the axis A to facilitate rotational access to the travel stop 40 therein and there by provide precise adjustment of the valve 20.

The valve 20 thereby permits fluid mixture ratio adjustments in various open loop controlled systems such as liquid propulsion rocket engines without the need to break into propellant lines.

It should be understood that like reference numerals identify corresponding or similar elements throughout the several drawings. It should also be understood that although a particular component arrangement is disclosed in the illustrated embodiment, other arrangements will benefit herefrom.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A valve comprising:
a housing;
a sleeve at least partially surrounded by said housing, said sleeve slidable relative to said housing; and
a travel stop that is engageable with said sleeve to limit a stroke travel of said sleeve, wherein said travel stop includes an interrupted thread, wherein said interrupted thread includes a multiple of linear slots transverse to said interrupted thread.

2. The valve as recited in claim 1, further comprising a travel stop lock engageable with one of said multiple of linear slots to rotationally lock said travel stop.

3. The valve as recited in claim 2, wherein said travel stop lock is mountable to said housing.

4. The valve as recited in claim 3, wherein said travel stop lock includes a key that is received within one of said multiple of linear slots.

5. The valve as recited in claim 4, wherein said key is axially restrained by a threaded mount threaded into said housing.

6. The valve as recited in claim 5, wherein said travel stop is accessible through a threaded aperture for said threaded mount.

7. A valve comprising:
a housing;
a sleeve at least partially surrounded by said housing, said sleeve slidable relative to said housing; and
a travel stop that is engageable with said sleeve to limit a stroke travel of said sleeve, wherein said travel stop includes an interrupted thread, wherein said interrupted thread includes a multiple of linear slots parallel to said axis.

8. A valve comprising:
a travel stop with an interrupted thread, said interrupted thread includes a multiple of linear slots, wherein said travel stop at least partially surrounds a sleeve to selectively adjust a stroke travel limit of said sleeve.

9. A valve comprising:
a travel stop with an interrupted thread, said interrupted thread includes a multiple of linear slots;
a travel stop lock engageable with one of said multiple of linear slots to rotationally lock said travel stop, wherein said travel stop lock includes a key that is received within one of said multiple of linear slots, wherein said key is axially restrained by a threaded mount threaded into a housing that contains said travel stop.

10. The valve as recited in claim 9, wherein said travel stop is accessible through a threaded aperture for said threaded mount.

* * * * *